(12) United States Patent
Gisquet et al.

(10) Patent No.: US 10,499,060 B2
(45) Date of Patent: Dec. 3, 2019

(54) VIDEO ENCODING AND DECODING WITH IMPROVED ERROR RESILIENCE

(71) Applicant: CANON KABUSHIKI KAISHA, Tokyo (JP)

(72) Inventors: Christophe Gisquet, Rennes (FR); Guillaume Laroche, Melesse (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/962,922

(22) Filed: Apr. 25, 2018

(65) Prior Publication Data

US 2018/0242000 A1    Aug. 23, 2018

Related U.S. Application Data

(63) Continuation of application No. 15/170,195, filed on Jun. 1, 2016, now Pat. No. 9,979,968, which is a
(Continued)

(30) Foreign Application Priority Data

Jan. 12, 2011    (GB) .................................. 1100462.9

(51) Int. Cl.
*H04N 11/02*    (2006.01)
*H04N 19/139*    (2014.01)
(Continued)

(52) U.S. Cl.
CPC ......... *H04N 19/139* (2014.11); *H04N 19/103* (2014.11); *H04N 19/176* (2014.11);
(Continued)

(58) Field of Classification Search
CPC .................................................. H04N 19/139
(Continued)

(56) References Cited

U.S. PATENT DOCUMENTS 5,552,831 A     9/1996   Machida
6,501,863 B1 *  12/2002  Fukuhara ................ G06T 9/007
                                                          382/232
(Continued)

FOREIGN PATENT DOCUMENTS

CN    1256049 A    6/2000
CN    1440203 A    9/2003
(Continued)

OTHER PUBLICATIONS

Guillaume Laroche et al; RD Optimized Coding for Motion Vector Predictor Selection;IEEE Transactions on Circuits and Systems for Video Technology, vol. 18, No. 12, pp. 1681-1691.
(Continued)

*Primary Examiner* — Leron Beck
(74) *Attorney, Agent, or Firm* — Canon U.S.A., Inc. IP Division

(57) ABSTRACT

An encoding method comprises obtaining a target number of motion information predictors to be used for an image portion to encode and generating a set of motion information predictors using the obtained target number. The set is generated by: obtaining a first set of motion information predictors each associated with an image portion having a predetermined spatial and/or temporal relationship with the image portion being encoded; modifying the first set of motion information predictors by removing duplicate motion information predictors to obtain a reduced set of motion information predictors containing a first number of motion information predictors, each motion information predictor of the reduced set being different from any other motion information predictor of the reduced set; comparing the first number of motion information predictors to the target number obtained, and if the first number is lower than the target number, obtaining an additional motion informa-
(Continued)

tion predictor and adding it to the reduced set of motion information predictors.

3 Claims, 8 Drawing Sheets

Related U.S. Application Data continuation of application No. 13/978,987, filed as application No. PCT/EP2012/050391 on Jan. 11, 2012, now Pat. No. 9,386,312.

(51) Int. Cl.
    *H04N 19/52*     (2014.01)
    *H04N 19/176*     (2014.01)
    *H04N 19/46*     (2014.01)
    *H04N 19/103*     (2014.01)
    *H04N 19/192*     (2014.01)
    *H04N 19/89*     (2014.01)
    *H04N 19/65*     (2014.01)

(52) U.S. Cl.
    CPC ........... *H04N 19/192* (2014.11); *H04N 19/46* (2014.11); *H04N 19/52* (2014.11); *H04N 19/65* (2014.11); *H04N 19/89* (2014.11)

(58) Field of Classification Search
    USPC ....................................... 375/240.01–240.29
    See application file for complete search history.

(56) References Cited

U.S. PATENT DOCUMENTS

| | | | |
|---|---|---|---|
| 6,552,673 B2 | 4/2003 | Webb | |
| 6,584,125 B1* | 6/2003 | Katto | H04N 7/52 348/512 |
| 7,248,741 B2 | 7/2007 | Akimoto | |
| 7,630,442 B2 | 12/2009 | Sekiguchi | |
| 9,008,182 B2* | 4/2015 | Tsai | H04N 19/56 375/240.16 |
| 2002/0012396 A1* | 1/2002 | Pau | H04N 5/145 375/240.16 |
| 2006/0153300 A1* | 7/2006 | Wang | H04N 19/56 375/240.16 |
| 2007/0047649 A1 | 3/2007 | Suzuki | |
| 2007/0064805 A1* | 3/2007 | Carrig | H04N 19/46 375/240.16 |
| 2007/0081588 A1 | 4/2007 | Raveendran | |
| 2007/0248331 A1 | 10/2007 | Hamada | |
| 2008/0002770 A1 | 1/2008 | Ugur | |
| 2008/0247461 A1 | 10/2008 | Nishida | |
| 2008/0310510 A1* | 12/2008 | Hiwasa | H04N 9/8042 375/240.16 |
| 2009/0052535 A1* | 2/2009 | Ugur | H04N 19/593 375/240.13 |
| 2009/0304084 A1* | 12/2009 | Hallapuro | H04N 19/52 375/240.16 |
| 2010/0020881 A1 | 1/2010 | Kotaka | |
| 2010/0182499 A1 | 7/2010 | Setton | |
| 2010/0195733 A1* | 8/2010 | Yan | H04N 19/139 375/240.16 |
| 2010/0284465 A1* | 11/2010 | Benzler | H04N 19/567 375/240.16 |
| 2010/0322317 A1* | 12/2010 | Yoshimatsu | H04N 19/70 375/240.24 |
| 2011/0013697 A1* | 1/2011 | Choi | H04N 19/105 375/240.16 |
| 2011/0080955 A1* | 4/2011 | Shi | H04N 5/145 375/240.16 |
| 2011/0090965 A1* | 4/2011 | Chan | H04N 19/597 375/240.16 |
| 2011/0194608 A1* | 8/2011 | Rusert | H04N 19/105 375/240.16 |
| 2011/0194784 A1* | 8/2011 | Laroche | H04N 19/176 382/238 |
| 2011/0317930 A1 | 12/2011 | Kim | |
| 2012/0082228 A1* | 4/2012 | Su | H03M 7/4031 375/240.16 |
| 2013/0294521 A1 | 7/2013 | Gisquet | |

FOREIGN PATENT DOCUMENTS

| | | |
|---|---|---|
| CN | 1450809 A | 10/2003 |
| CN | 1525762 A | 9/2004 |
| CN | 1622635 A | 1/2005 |
| CN | 1575590 A | 2/2005 |
| CN | 1599461 A | 3/2005 |
| CN | 1671209 A | 9/2005 |
| CN | 1832575 A | 9/2006 |
| CN | 1893665 A | 1/2007 |
| CN | 101120594 A | 2/2008 |
| CN | 101123728 A | 2/2008 |
| CN | 101123731 A | 2/2008 |
| CN | 101155311 A | 4/2008 |
| CN | 101247522 A | 8/2008 |
| CN | 101304532 A | 11/2008 |
| CN | 101305616 A | 11/2008 |
| CN | 101350927 A | 1/2009 |
| CN | 101375602 A | 2/2009 |
| CN | 101466036 A | 6/2009 |
| CN | 101584215 A | 11/2009 |
| CN | 101631247 A | 1/2010 |
| CN | 101777963 A | 7/2010 |
| CN | 101822061 A | 9/2010 |
| CN | 101860754 A | 10/2010 |
| CN | 101931803 A | 12/2010 |
| CN | 101931821 A | 12/2010 |
| EP | 1033883 A1 | 9/2000 |
| EP | 1727090 A1 | 11/2006 |
| JP | 2007228371 A | 9/2007 |
| JP | 6165219 B2 | 7/2017 |
| RU | 2368095 C1 | 9/2009 |
| RU | 2369039 C1 | 9/2009 |
| WO | 2005055608 A1 | 6/2005 |
| WO | 2009115901 A2 | 9/2009 |
| WO | 2010/041624 A1 | 4/2010 |
| WO | 2010146314 A1 | 12/2010 |

OTHER PUBLICATIONS

J Jung et al; Joint Collaborative Team on Video Coding (JCT-VC) of ITU-T SG16 WP3 and ISO/IEC JTC1/SC29/WG11, 4th Meeting, JCTVC-D197.

\* cited by examiner

VIDEO ENCODING AND DECODING WITH IMPROVED ERROR RESILIENCE

CROSS-REFERENCE TO RELATED APPLICATIONS

This application is a Continuation of U.S. patent application Ser. No. 15/170,195 filed on Jun. 1, 2016, which is a continuation and claims the benefit of U.S. application Ser. No. 13/978,987 filed Jul. 10, 2013 (now U.S. Pat. No. 9,386,312), which is a National Phase Application of International Application PCT/EP2012/050391, filed Jan. 11, 2012, which claims the benefit of Great Britain Patent Application No. 1100462.9, filed Jan. 12, 2011. Each of U.S. patent application Ser. No. 15/170,195, U.S. patent application Ser. No. 13/978,987, International Application PCT/EP2012/050391, and Great Britain Patent Application No. 1100462.9 is hereby incorporated by reference in their entirety.

This application is related to, but does not claim benefit from, PCT Application Nos. PCT/EP2012/050389, PCT/EP2012/050390, PCT/EP2012/050392 and PCT/EP2012/050393, each filed on Jan. 11, 2012 and titled "Video Encoding and Decoding with Improved Error Resilience", United Kingdom Patent Application No. 1104032.6, filed on Mar. 9, 2011 and titled "Video Encoding and Decoding with Improved Error Resilience", and United Kingdom Patent Application Nos. 1111866.8 and 1111867.6, both filed on Jul. 11, 2011 and titled "Video Encoding and Decoding with Improved Error Resilience".

FIELD OF THE INVENTION

The invention relates to a method and device for encoding a sequence of digital images and a method and device for decoding a corresponding bitstream.

The invention belongs to the field of digital signal processing, and in particular to the field of video compression using motion compensation to reduce spatial and temporal redundancies in video streams.

DESCRIPTION OF THE PRIOR-ART

Many video compression formats, for example H.263, H.264, MPEG-1, MPEG-2, MPEG-4, SVC, use block-based discrete cosine transform (DCT) and motion compensation to remove spatial and temporal redundancies. They can be referred to as predictive video formats. Each frame or image of the video signal is divided into slices which are encoded and can be decoded independently. A slice is typically a rectangular portion of the frame, or more generally, a portion of a frame or an entire frame. Further, each slice is divided into macroblocks (MBs), and each macroblock is further divided into blocks, typically blocks of 8×8 pixels. The encoded frames are of two types: temporal predicted frames (either predicted from one reference frame called P-frames or predicted from two reference frames called B-frames) and non temporal predicted frames (called Intra frames or I-frames).

Temporal prediction consists in finding in a reference frame, either a previous or a future frame of the video sequence, an image portion or reference area which is the closest to the block to encode. This step is known as motion estimation. Next, the difference between the block to encode and the reference portion is encoded (motion compensation), along with an item of motion information relative to the motion vector which indicates the reference area to use for motion compensation.

In order to further reduce the cost of encoding motion information, it has been proposed to encode a motion vector by difference from a motion vector predictor, typically computed from the motion vectors of the blocks surrounding the block to encode.

In H.264, motion vectors are encoded with respect to a median predictor computed from the motion vectors situated in a causal neighbourhood of the block to encode, for example from the blocks situated above and to the left of the block to encode. Only the difference, also called residual motion vector, between the median predictor and the current block motion vector is encoded.

The encoding using residual motion vectors saves some bitrate, but necessitates that the decoder performs the same computation of the motion vector predictor in order to decode the value of the motion vector of a block to decode.

Recently, further improvements have been proposed, such as using a plurality of possible motion vector predictors. This method, called motion vector competition, consists in determining between several motion vector predictors or candidates which motion vector predictor minimizes the encoding cost, typically a rate-distortion cost, of the residual motion information. The residual motion information comprises the residual motion vector, i.e. the difference between the actual motion vector of the block to encode and the selected motion vector predictor, and an item of information indicating the selected motion vector predictor, such as for example an encoded value of the index of the selected motion vector predictor.

In the High Efficiency Video Coding (HEVC) currently in the course of standardization, it has been proposed to use a plurality of motion vector predictors as schematically illustrated in FIG. 1: 3 so-called spatial motion vector predictors $V_1$, $V_2$ and $V_3$ taken from blocks situated in the neighbourhood of the block to encode, a median motion vector predictor computed based on the components of the three spatial motion vector predictors $V_1$, $V_2$ and $V_3$ and a temporal motion vector predictor $V_0$ which is the motion vector of the co-located block in a previous image of the sequence (e.g. block of image N−1 located at the same spatial position as block 'Being coded' of image N). Currently in HEVC the 3 spatial motion vector predictors are taken from the block situated to the left of the block to encode ($V_3$), the block situated above ($V_2$) and from one of the blocks situated at the respective corners of the block to encode, according to a predetermined rule of availability. This motion vector predictor selection scheme is called Advanced Motion Vector Prediction (AMVP). In the example of FIG. 1, the vector $V_1$ of the block situated above left is selected.

Finally, a set of 5 motion vector predictor candidates mixing spatial predictors and temporal predictors is obtained. In order to reduce the overhead of signaling the motion vector predictor in the bitstream, the set of motion vector predictors is reduced by eliminating the duplicated motion vectors, i.e. the motion vectors which have the same value. For example, in the illustration of FIG. 1, $V_1$ and $V_2$ are equal, and $V_0$ and $V_3$ are also equal, so only two of them should be kept as motion vector prediction candidates, for example $V_0$ and $V_1$. In this case, only one bit is necessary to indicate the index of the motion vector predictor to the decoder.

A further reduction of the set of motion vector predictors, based on the values of the predictors, is possible. Once the best motion vector predictor is selected and the motion vector residual is computed, it is possible to further eliminate from the prediction set the candidates which would have not been selected, knowing the motion vector residual and the cost optimization criterion of the encoder. A sufficient reduction of the set of predictors leads to a gain in the signaling overhead, since the indication of the selected motion vector predictor can be encoded using fewer bits. At the limit, the set of candidates can be reduced to 1, for example if all motion vector predictors are equal, and therefore it is not necessary to insert any information relative to the selected motion vector predictor in the bitstream.

To summarize, the encoding of motion vectors by difference with a motion vector predictor, along with the reduction of the number of motion vector predictor candidates leads to a compression gain. However, as explained above, for a given block to encode, the reduction of the number of motion vector predictor candidates is based on the values taken by the motion vector predictors of the set, in particular the values of the motion vectors of the neighbouring blocks and of the motion vector of the co-located block. Also, the decoder needs to be able to apply the same analysis of the set of possible motion vector predictors as the encoder, in order to deduce the amount of bits used for indicating the selected motion vector predictor and to be able to decode the index of the motion vector predictor and finally to decode the motion vector using the motion vector residual received. Referring to the example of FIG. 1, the set of motion vector predictors of the block 'being coded' is reduced by the encoder to $V_0$ and $V_1$, so the index is encoded on one single bit. If the block 'Co-located' of image N−1 is lost during transmission, the decoder cannot obtain the value of $V_0$, and therefore cannot find out that $V_0$ and $V_3$ are equal. Therefore, the decoder cannot find how many bits were used for encoding the index of the motion vector predictor for the block 'Being coded', and consequently the decoder cannot correctly parse the data for the slice because it cannot find where the index encoding stops and the encoding of video data starts.

Therefore, the fact that the number of bits used for signaling the motion vector predictors depends of the values taken by the motion vector predictors makes the method very vulnerable to transmission errors, when the bitstream is transmitted to a decoder on a lossy communication network. Indeed, the method requires the knowledge of the values of the motion vector predictors to parse the bitstream correctly at the decoder. In case of packet losses, when some motion vector residual values are lost, it is impossible for the decoder to determine how many bits were used to encode index representing the motion vector predictor, and so it is impossible to parse the bitstream correctly. Such an error may propagate causing the decoder's de-synchronization until a following synchronization image, encoded without prediction, is received by the decoder.

It would be desirable to at least be able to parse an encoded bitstream at a decoder even in case of packet losses, so that some re-synchronization or error concealment can be subsequently applied.

It was proposed, in the document JCTVC-C166r1, 'TE11: Study on motion vector coding (experiment 3.3a and 3.3c)' by K. Sato, published at the $3^{rd}$ meeting of the Joint Collaborative Team on Video Coding (JTC-VC) of Guangzhou, 7-15 of Oct. 2010, to use only the spatial motion vector predictors coming from the same slice in the predictor set. This solution solves the problem of parsing at the decoder in case of slice losses. However, the coding efficiency is significantly decreased, since the temporal motion vector predictor is no longer used. Therefore, this solution is not satisfactory in terms of compression performance.

SUMMARY OF THE INVENTION

It is desirable to address one or more of the prior art drawbacks.

According to one aspect of the present invention there is provided a method of encoding a sequence of digital images into a bitstream, at least one portion of an image being encoded by motion compensation with respect to a reference image portion, wherein, for at least one image portion to encode, the method comprises the steps of:
  obtaining a target number of motion information predictors to be used for said image portion to encode and
  generating a set of motion information predictors using the obtained target number of motion information predictors;
  and wherein the generating step comprises:
  obtaining a first set of motion information predictors each associated with an image portion having a predetermined spatial and/or temporal relationship with said image portion being encoded,
  modifying said first set of motion information predictors by removing duplicate motion information predictors to obtain a reduced set of motion information predictors containing a first number of motion information predictors, each motion information predictor of said reduced set being different from any other motion information predictor of said reduced set
  after obtaining said reduced set of motion information predictors, comparing said first number of motion information predictors to said target number obtained, and
  if said first number is lower than said target number,
    obtaining an additional motion information predictor, and
    adding said additional motion information predictor to said reduced set of motion information predictors.

According to another aspect of the present invention there is provided a method of decoding a bitstream comprising an encoded sequence of digital images, at least one portion of an image being encoded by motion compensation with respect to a reference image, wherein, for at least one image portion to decode, the method comprises the steps of:
  obtaining a target number of motion information predictors to be used for said image portion to decode and
  generating a set of motion information predictors using the obtained target number of motion information predictors;
  and wherein the generating step comprises:
  obtaining a first set of motion information predictors each associated with an image portion having a predetermined spatial and/or temporal relationship with said image portion being decoded,
  modifying said first set of motion information predictors by removing duplicate motion information predictors to obtain a reduced set of motion information predictors containing a first number of motion information predictors, each motion information predictor of said reduced set being different from any other motion information predictor of said reduced set
  after obtaining said reduced set of motion information predictors, comparing said first number of motion information predictors to said target number obtained, and if said first number is lower than said target number,
obtaining an additional motion information predictor, and
adding said additional motion information predictor to said reduced set of motion information predictors.

According to another aspect of the present invention there is provided a device for encoding a sequence of digital images into a bitstream, at least one portion of an image being encoded by motion compensation with respect to a reference image portion,
the device comprising:
means for obtaining a target number of motion information predictors to be used for an image portion to encode and
means for generating a set of motion information predictors using the obtained target number of motion information predictors;
and wherein the generating means comprises:
means for obtaining a first set of motion information predictors each associated with an image portion having a predetermined spatial and/or temporal relationship with said image portion being decoded,
means for modifying said first set of motion information predictors by removing duplicate motion information predictors to obtain a reduced set of motion information predictors containing a first number of motion information predictors, each motion information predictor of said reduced set being different from any other motion information predictor of said reduced set
means operable, after obtaining said reduced set of motion information predictors, to compare said first number of motion information predictors to said target number obtained, and further operable
if said first number is lower than said target number,
to obtain an additional motion information predictor, and
to add said additional motion information predictor to said reduced set of motion information predictors.

According to another aspect of the present invention there is provided a method of decoding a bitstream comprising an encoded sequence of digital images, at least one portion of an image being encoded by motion compensation with respect to a reference image, the device comprising:
means for obtaining a target number of motion information predictors to be used for an image portion to decode and
means for generating a set of motion information predictors using the obtained target number of motion information predictors;
and wherein the generating means comprises:
means for obtaining a first set of motion information predictors each associated with an image portion having a predetermined spatial and/or temporal relationship with said image portion being decoded,
means for modifying said first set of motion information predictors by removing duplicate motion information predictors to obtain a reduced set of motion information predictors containing a first number of motion information predictors, each motion information predictor of said reduced set being different from any other motion information predictor of said reduced set
means operable, after obtaining said reduced set of motion information predictors, to compare said first number of motion information predictors to said target number obtained, and further operable if said first number is lower than said target number,
to obtain an additional motion information predictor, and
to add said additional motion information predictor to said reduced set of motion information predictors.

Further aspects of the present invention provide computer programs which, when run on a computer, cause the computer to carry out a method for encoding a digital video signal as described above or a method for decoding a bitstream as described above. In each case the computer program may be stored on a computer-readable storage medium.

According to another aspect of the present invention there is provided a method of encoding a sequence of digital images into a bitstream, at least one portion of an image being encoded by motion compensation with respect to a reference image portion,
wherein, for at least one image portion to encode, the method comprises the steps of:
obtaining a target number of motion information predictors to be used for said image portion to encode and
obtaining a first set of motion information predictors each associated with an image portion having a predetermined spatial and/or temporal relationship with said image portion being encoded,
eliminating duplicates from said first set of motion information predictors to obtain a reduced set of motion information predictors containing a first number of motion information predictors, each motion information predictor of said reduced set being different from any other motion information predictor of said reduced set
after obtaining said reduced set of motion information predictors, comparing said first number of motion information predictors to said target number obtained, and
if said first number is lower than said target number,
obtaining an additional motion information predictor, and
adding said additional motion information predictor to said reduced set of motion information predictors.

In one embodiment, the motion information predictors of said reduced set are actual motion information predictors, having motion vectors obtained from image portions of said image being encoded or of a reference image, and said additional motion information predictor is a further such actual motion information predictor.

In one embodiment, the motion information predictors of said reduced set are actual motion information predictors, having motion vectors obtained from image portions of said image being encoded or of a reference image, and said additional motion information predictor is a virtual motion information predictor not having a motion vector obtained from an image portion of said image being encoded or of a reference image.

In one embodiment the method comprises testing whether the number of motion information predictors in said reduced set is lower than said target number and, if so, first adding one or more said further actual motion information predictors, then testing again whether the number of motion information predictors after adding the further actual motion information predictors is lower than said target number and, if so, adding one or more said virtual motion information predictors.

According to another aspect of the present invention there is provided a method of decoding a bitstream comprising an encoded sequence of digital images, at least one portion of an image being encoded by motion compensation with respect to a reference image, wherein, for at least one image portion to decode, the method comprises the steps of:

obtaining a target number of motion information predictors to be used for said image portion to decode and obtaining a first set of motion information predictors each associated with an image portion having a predetermined spatial and/or temporal relationship with said image portion being decoded, eliminating duplicates from said first set of motion information predictors to obtain a reduced set of motion information predictors containing a first number of motion information predictors, each motion information predictor of said reduced set being different from any other motion information predictor of said reduced set after obtaining said reduced set of motion information predictors, comparing said first number of motion information predictors to said target number obtained, and if said first number is lower than said target number,
obtaining an additional motion information predictor, and
adding said additional motion information predictor to said reduced set of motion information predictors.

In one embodiment, the motion information predictors of said reduced set are actual motion information predictors, having motion vectors obtained from image portions of said image being decoded or of a reference image, and said additional motion information predictor is a further such actual motion information predictor.

In one embodiment, the motion information predictors of said reduced set are actual motion information predictors, having motion vectors obtained from image portions of said image being decoded or of a reference image, and said additional motion information predictor is a virtual motion information predictor not having a motion vector obtained from an image portion of said image being decoded or of a reference image.

In one embodiment the method comprises testing whether the number of motion information predictors in reduced set is lower than said target number and, if so, first adding one or more said further actual motion information predictors, then testing again whether the number of motion information predictors after adding the further actual motion information predictors is lower than said target number and, if so, adding one or more said virtual motion information predictors.

Further aspects of the invention provide a corresponding device for encoding, a corresponding device for decoding, and corresponding computer programs and computer-readable storage media.

According to another aspect of the present invention there is provided a method of encoding a sequence of digital images into a bitstream, at least one portion of an image being encoded by motion compensation with respect to a reference image portion, wherein, for at least one image portion to encode, the method comprises the steps of:

obtaining a target number of motion information predictors to be used for said image portion to encode and generating a set of motion information predictors, each motion information predictor of the generated set being associated with an image portion having a predetermined spatial and/or temporal relationship with said image portion being encoded;

eliminating duplicates from the generated set to obtain a first set of motion information predictors containing a first number of motion information predictors, each motion information predictor of the first set being different from any other motion information predictor of the first set;

after obtaining said first set of motion information predictors, comparing said first number of motion information predictors to said target number obtained, and if said first number is lower than said target number,
obtaining an additional motion information predictor, and
adding said additional motion information predictor to said first set of motion information predictors.

In one embodiment, the motion information predictors of said first set are actual motion information predictors, having motion vectors obtained from image portions of said image being encoded or of a reference image, and said additional motion information predictor is a further such actual motion information predictor.

In one embodiment, the motion information predictors of said first set are actual motion information predictors, having motion vectors obtained from image portions of said image being encoded or of a reference image, and said additional motion information predictor is a virtual motion information predictor not having a motion vector obtained from an image portion of said image being encoded or of a reference image.

In one embodiment the method comprises testing whether the number of motion information predictors in said first set is lower than said target number and, if so, first adding one or more said further actual motion information predictors, then testing again whether the number of motion information predictors after adding the further actual motion information predictors is lower than said target number and, if so, adding one or more said virtual motion information predictors.

According to another aspect of the present invention there is provided a method of decoding a bitstream comprising an encoded sequence of digital images, at least one portion of an image being encoded by motion compensation with respect to a reference image, wherein, for at least one image portion to decode, the method comprises the steps of:

obtaining a target number of motion information predictors to be used for said image portion to decode and generating a set of motion information predictors, each motion information predictor of the generated set being associated with an image portion having a predetermined spatial and/or temporal relationship with said image portion being decoded;

eliminating duplicates from the generated set to obtain a first set of motion information predictors containing a first number of motion information predictors, each motion information predictor of the first set being different from any other motion information predictor of the first set;

after obtaining said first set of motion information predictors, comparing said first number of motion information predictors to said target number obtained, and if said first number is lower than said target number,
obtaining an additional motion information predictor, and
adding said additional motion information predictor to said first set of motion information predictors.

In one embodiment, the motion information predictors of said first set are actual motion information predictors, having motion vectors obtained from image portions of said image being decoded or of a reference image, and said additional motion information predictor is a further such actual motion information predictor.

In one embodiment, the motion information predictors of said first set are actual motion information predictors, having motion vectors obtained from image portions of said image being decoded or of a reference image, and said additional motion information predictor is a virtual motion information predictor not having a motion vector obtained from an image portion of said image being decoded or of a reference image.

In one embodiment the method comprises testing whether the number of motion information predictors in said first set is lower than said target number and, if so, first adding one or more said further actual motion information predictors, then testing again whether the number of motion information predictors after adding the further actual motion information predictors is lower than said target number and, if so, adding one or more said virtual motion information predictors.

Further aspects of the invention provide a corresponding device for encoding, a corresponding device for decoding, and corresponding computer programs and computer-readable storage media.

It is also desirable to provide a method allowing correct parsing at the decoder even in the case of a bitstream corrupted by transmission losses while keeping good compression efficiency.

To that end, the invention relates to method of encoding a sequence of digital images into a bitstream, at least one portion of an image being encoded by motion compensation with respect to a reference image portion. The method comprises, for at least one image portion to encode, the steps of:
  obtaining a target number of motion information predictors to be used for said image portion to encode, and
  generating a set of motion information predictors consisting of said target number of motion information predictors, each motion information predictor of the generated set being different from any other motion information predictor of the generated set.

Advantageously, the method of the invention allows the systematic determination of a target number of motion information predictors to be used for encoding motion information, such as a motion vector, associated with an image portion, and the compression is advantageously improved by generating a set of motion information predictors which are all different from one another. The potential overhead of using a fixed target number of motion information predictors is compensated by the variety of predictors selected which helps improving the compression rate. The target number of different motion information predictors is determined and fixed independently of the actual values of the items of motion information, such as motion vectors, selected as motion information predictors for the current image portion to encode.

An embodiment of the present invention is effective when the number of motion information predictors that is initially generated is a priori unknown, for example as when AMVP is used. For example, if reduction of an initial set is carried out, and the number of initial predictors removed by the reduction process is a priori unknown, an embodiment of the present invention can be used to ensure that the final set of motion information predictors consists of the target number of motion information predictors.

According to an embodiment, the encoding method further comprises the steps of:
  selecting a motion information predictor for said image portion to encode from said generated set of motion information predictors, and
  encoding an item of information representative of said selected motion information predictor based upon said target number obtained.

Advantageously, a motion information predictor can be selected for a current block to encode and the selected motion vector predictor can be encoded depending on the number of motion information predictors determined. The number of motion information predictors can be systematically retrieved by the decoder, so that the encoded bitstream can be systematically parsed at a decoder even in case of losses.

According to an embodiment, the item of information representative of said selected motion vector predictor is an index of the selected motion vector predictor in the generated set of motion information predictors, and the index is encoded on a number of bits dependent upon said target number obtained.

According to an embodiment, in the step of obtaining a target number of motion information predictors to be used for said image portion to encode, said target number is set equal to a predetermined value for any image portion to encode of the sequence of digital images.

The advantage of this embodiment is that the target number of motion information predictors can be easily obtained, without any supplementary computation or signaling overhead, at both the encoder or the decoder.

According to another embodiment, in the step of obtaining a target number of motion information predictors to be used for said image portion to encode, said target number is determined, for a given image portion to encode, depending upon an encoding information of said given image portion to encode.

Advantageously, such an encoding information can be an encoding parameter, such as for example, if the images are divided into variable size macroblocks for processing, the size of the macroblock to which the image portion to encode belongs. Such an encoding information may also be for example an encoding mode associated with the image portion to encode.

According to yet another aspect, the invention relates to a device for encoding a sequence of digital images into a bitstream, at least one portion of an image being encoded by motion compensation with respect to a reference image portion. The device comprises, for at least one image portion to encode:
  means for obtaining a target number of motion information predictors to be used for said image portion to encode, and
  means for generating a set of motion information predictors consisting of said target number of motion information predictors, each motion information predictor of the generated set being different from any other motion information predictor of the generated set.

According to yet another aspect, the invention also relates to a computer program product that can be loaded into a programmable apparatus, comprising sequences of instructions for implementing a method for encoding a sequence of digital images as briefly described above, when the program is loaded into and executed by the programmable apparatus. Such a computer program may be transitory or non transitory. In an implementation, the computer program can be stored on a non-transitory computer-readable carrier medium.

The particular characteristics and advantages of the device for encoding a sequence of digital images, of the storage means and of the computer program product being similar to those of the digital video signal encoding method, they are not repeated here.

According to yet another aspect, the invention also relates to a method for decoding a bitstream comprising an encoded sequence of digital images, at least one portion of an image being encoded by motion compensation with respect to a reference image. For at least one said image portion to decode, the method comprises the steps of:

obtaining a target number of motion information predictors to be used for said image portion to decode, and generating a set of motion information predictors consisting of said target number of motion information predictors, each motion information predictor of the generated set being different from any other motion information predictor of the generated set.

The method for decoding a bitstream has the advantage of allowing determining a target number of motion information predictors and using such a number of different motion information predictors. The target number of motion information predictors can be systematically retrieved, and consequently the bitstream can be parsed systematically, even in case of transmission errors. A further advantage is that in all cases, the parsing of the bitstream is simple, and in particular simpler than with prior art methods which adaptively reduce the number of motion information predictors instead of using a predetermined target number that can be obtained by the decoder.

According to an embodiment, the method further comprises a step of decoding an item of information representative of a selected motion information predictor for said image portion to decode based upon said target number obtained.

Advantageously, in case an encoding dependent on the number of motion information predictors has been applied at the encoder, the item of information representative of the selected motion information predictor for said image portion to decode can be systematically decoded, even in case of transmission errors.

According to yet another aspect, the invention also relates to a device for decoding a bitstream comprising an encoded sequence of digital images, at least one portion of an image being encoded by motion compensation with respect to a reference image portion. The device comprises, for at least one said image portion to decode:

means for obtaining a target number of motion information predictors to be used for said image portion to decode, and means for generating a set of motion information predictors consisting of said target number of motion information predictors, each motion information predictor of the generated set being different from any other motion information predictor of the generated set.

According to yet another aspect, the invention also relates to an information storage means that can be read by a computer or a microprocessor, this storage means being removable, and storing instructions of a computer program for the implementation of the method for decoding a bitstream as briefly described above.

According to yet another aspect, the invention also relates to a computer program product that can be loaded into a programmable apparatus, comprising sequences of instructions for implementing a method for decoding a bitstream as briefly described above, when the program is loaded into and executed by the programmable apparatus. Such a computer program may be transitory or non transitory. In an implementation, the computer program can be stored on a non-transitory computer-readable carrier medium.

The particular characteristics and advantages of the device for decoding a bitstream, of the storage means and of the computer program product being similar to those of the decoding method, they are not repeated here.

According to another aspect of the present invention there is provided a method of encoding a sequence of digital images into a bitstream, at least one portion of an image being encoded by motion compensation with respect to a reference image portion, the method comprising generating a set of motion information predictors having controlled diversity and selecting a motion information predictor for said image portion to encode from said generated set of motion information predictors.

Controlled diversity means that the motion information predictors of the set are different from one another but one or more of them are statistically likely to be close to the actual motion information so that a residual (difference between the actual motion information and the predictor concerned) is small and hence efficiently compressible.

The method may comprise:
generating first motion information predictors;
identifying one or more first motion information predictors as seed predictors;
generating one or more second motion information predictors based on the seed predictor(s); and
forming said set of motion information predictors from the first and/or second motion information predictors.

In this case, the first motion information predictors can be predictors expected statistically to give good results in terms of compression efficiency. The second motion information predictors, being based on the first predictors, can then be used to explore in an organized or systematic way other predictors in the predictor space neighbouring the first predictors. Such predictors may also be expected to give good results and the more the predictors that are examined the greater the chance of finding a good match to the actual motion information.

In one embodiment, at least one first motion information predictors is identified as such a seed predictor based on an importance of the first motion information predictor concerned.

The importance may be dependent on a number of times the first motion information predictor concerned appears among the first motion information predictors. The greater the number of times the more important the predictor is considered to be and the more likely it is to be used in the set. As well as looking for identical predictors (duplicates) it can also be effective to look for close matches, too.

Alternatively the importance may be dependent on a measure of how representative the first motion information predictor concerned is of the first motion information predictors as a whole. For example, if the first motion information predictors are averaged, the difference or distance between the average predictor and a given first motion information predictor is a measure of how representative the given predictor is of the first motion information predictors as a whole.

One way of controlling the diversity is to generate at least one said second motion information predictor by adding or subtracting an offset from one of said seed predictors. The offset may be fixed. It could also be a pseudo-random value as long as the same seed value is available to the decoder as to the encoder. If the seed predictors are vectors, it is also possible to control the diversity by adding to the seed predictor another vector, e.g. of fixed magnitude and predetermined direction relative to the direction of the seed predictor.

A plurality of said second motion information predictors may be generated based on the same said seed predictor. If the motion information predictors are vectors each having X and Y components, the plurality of second motion information predictors can be obtained by adding and/or subtracting offsets to/from one or both said components of the same said seed predictor. For example, the same offset can be added to and subtracted from the same seed predictor. If the seed predictor is a vector having X and Y components, there are a number of permutations of adding/subtracting offsets to/from one or both of the X and Y components of the same seed predictor. This is an efficient way of generating controlled diversity without a large processing burden.

Another way of controlling the diversity is to generate a plurality of second motion information predictors by forming average of different pairs (or other combinations) of first motion information predictors. For example, if the first motion information predictors are V1, V2 and V3, three second motion information predictors could be formed from the averages of V1 & V2, V2 & V3 and V3 & V1. It would also be possible to form different weighted combinations of the same first motion information predictors as different second motion information predictors. The first motion information predictors may be or include motion information predictors each associated with an image portion having a predetermined spatial and/or temporal relationship with the image portion being encoded. For example the motion information predictors used in AMVP may be first motion information predictors. These are a good source of seed predictors.

In another embodiment the method comprises:
generating first motion information predictors;
checking the differences between the generated first motion information predictors; and
excluding from said set of motion information predictors one or more first motion information predictors based on the differences.

By taking into account the differences between the first motion information predictors it is possible to control the diversity of the motion information predictors of the set. It is not necessary in this case to identify seed predictors among the first motion information predictors and generate second motion information predictors based on the seed predictors. This can be effective, for example, if a sufficiently high number of first motion information predictors are initially available.

For example, a first motion information predictor having the smallest difference from another first motion information predictor can be removed, as a way of controlling the diversity. The process can be repeated again, as necessary, to successively remove the less diverse predictors.

It is important to note that in this aspect of the invention a number of motion information predictors in said set can be variable.

However, as in the other basic aspect of the present invention the number of motion information predictors in said set can be predetermined at least for a given image portion to encode or even for all image portions (a target number). This makes it possible not only to achieve controlled diversity among the predictors of the set but also to solve the parsing problem noted in the introduction.

This aspect of the invention also provides a corresponding decoding method and corresponding encoding and decoding devices, as well as programs which cause the encoding and decoding.

According to yet another aspect, the invention relates to a method of encoding a sequence of digital images into a bitstream, at least one portion of an image being encoded by motion compensation with respect to a reference image portion. The method comprises, for at least one image portion to encode, the steps of:
obtaining a first set of motion vector predictors to be used for said image portion to encode, and
generating a second set of motion vector predictors from said first set of motion vector predictors, each motion vector predictor of the generated set being different from any other motion vector predictor of the generated second set of motion vector predictors, wherein at least one motion vector predictor of the second set is computed from a selected motion vector predictor of the first set.

Advantageously, the second set of motion vector predictors generated is used for encoding the motion vector associated with the portion of image to encode. The second set of motion vector predictors comprises a variety of different motion vector predictors, which are generated (and possibly selected) so as to enhance the compression efficiency.

According to an embodiment, a motion vector predictor of the first set is selected in a selecting step according to an importance value.

According to an embodiment, the encoding method comprises a step of computing an importance value associated with each motion vector predictor of the first set.

According to an embodiment, a motion vector predictor of the first set is selected in a selecting step according to a distance among the motion vector predictors of the first set.

The various embodiments for selecting a motion vector predictor to generate further additional or virtual motion vector predictors allow applying a controlled diversity selection, which has the advantage of improving the compression efficiency. Indeed, the use of motion vector predictors computed from important motion vector predictors of the initial set allows to more accurately represent the motion vector of the current image portion to encode. Again, it is not essential to have a fixed or target number of predictors in the final set.

According to an embodiment, the motion vector predictors of the first set of motion vector predictors are motion vectors associated with image portions to encode of the image being encoded and/or of a reference image. The first set may be made up of, or include, the predictors used in AMVP.

BRIEF DESCRIPTION OF THE DRAWINGS

Other features and advantages will appear in the following description, which is given solely by way of non-limiting example and made with reference to the accompanying drawings, in which.

DETAILED DESCRIPTION OF THE EMBODIMENTS

Figure 2:
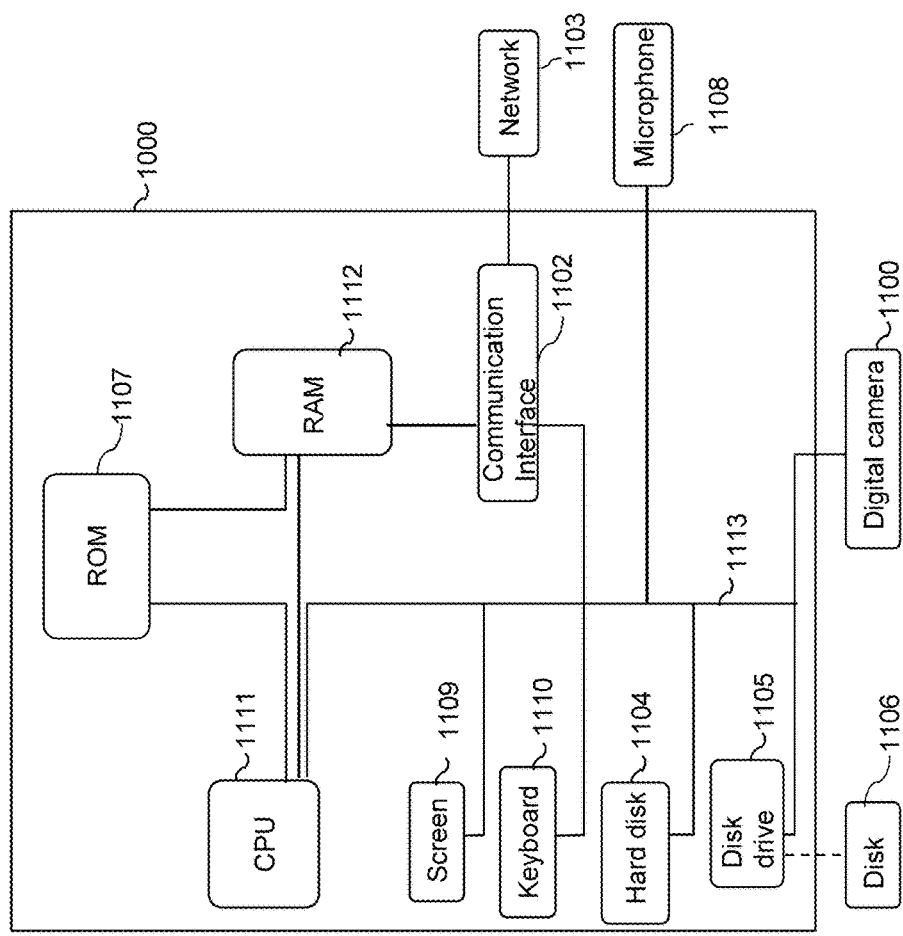
FIG. 2 is a diagram of a processing device adapted to implement an embodiment of the present invention.

FIG. 2 illustrates a diagram of a processing device 1000 adapted to implement one embodiment of the present invention. The apparatus 1000 is for example a micro-computer, a workstation or a light portable device.

The apparatus 1000 comprises a communication bus 1113 to which there are preferably connected:
- a central processing unit 1111, such as a microprocessor, denoted CPU;
- a read only memory 1107 able to contain computer programs for implementing the invention, denoted ROM;
- a random access memory 1112, denoted RAM, able to contain the executable code of the method of the invention as well as the registers adapted to record variables and parameters necessary for implementing the method of encoding a sequence of digital images and/or the method of decoding a bitstream; and
- a communication interface 1102 connected to a communication network 1103 over which digital data to be processed are transmitted.

Optionally, the apparatus 1000 may also have the following components:
- a data storage means 1104 such as a hard disk, able to contain the programs implementing the invention and data used or produced during the implementation of the invention;
- a disk drive 1105 for a disk 1106, the disk drive being adapted to read data from the disk 1106 or to write data onto said disk;
- a screen 1109 for displaying data and/or serving as a graphical interface with the user, by means of a keyboard 1110 or any other pointing means.

The apparatus 1000 can be connected to various peripherals, such as for example a digital camera 1100 or a microphone 1108, each being connected to an input/output card (not shown) so as to supply multimedia data to the apparatus 1000.

The communication bus affords communication and interoperability between the various elements included in the apparatus 1000 or connected to it. The representation of the bus is not limiting and in particular the central processing unit is able to communicate instructions to any element of the apparatus 1000 directly or by means of another element of the apparatus 1000.

The disk 1106 can be replaced by any information medium such as for example a compact disk (CD-ROM), rewritable or not, a ZIP disk or a memory card and, in general terms, by an information storage means that can be read by a microcomputer or by a microprocessor, integrated or not into the apparatus, possibly removable and adapted to store one or more programs whose execution enables the method of encoding a sequence of digital images and/or the method of decoding a bitstream according to the invention to be implemented.

The executable code may be stored either in read only memory 1107, on the hard disk 1104 or on a removable digital medium such as for example a disk 1106 as described previously. According to a variant, the executable code of the programs can be received by means of the communication network 1103, via the interface 1102, in order to be stored in one of the storage means of the apparatus 1000 before being executed, such as the hard disk 1104.

The central processing unit 1111 is adapted to control and direct the execution of the instructions or portions of software code of the program or programs according to the invention, instructions that are stored in one of the aforementioned storage means. On powering up, the program or programs that are stored in a non-volatile memory, for example on the hard disk 1104 or in the read only memory 1107, are transferred into the random access memory 1112, which then contains the executable code of the program or programs, as well as registers for storing the variables and parameters necessary for implementing the invention.

In this embodiment, the apparatus is a programmable apparatus which uses software to implement the invention. However, alternatively, the present invention may be implemented in hardware (for example, in the form of an Application Specific Integrated Circuit or ASIC).

Figure 3:
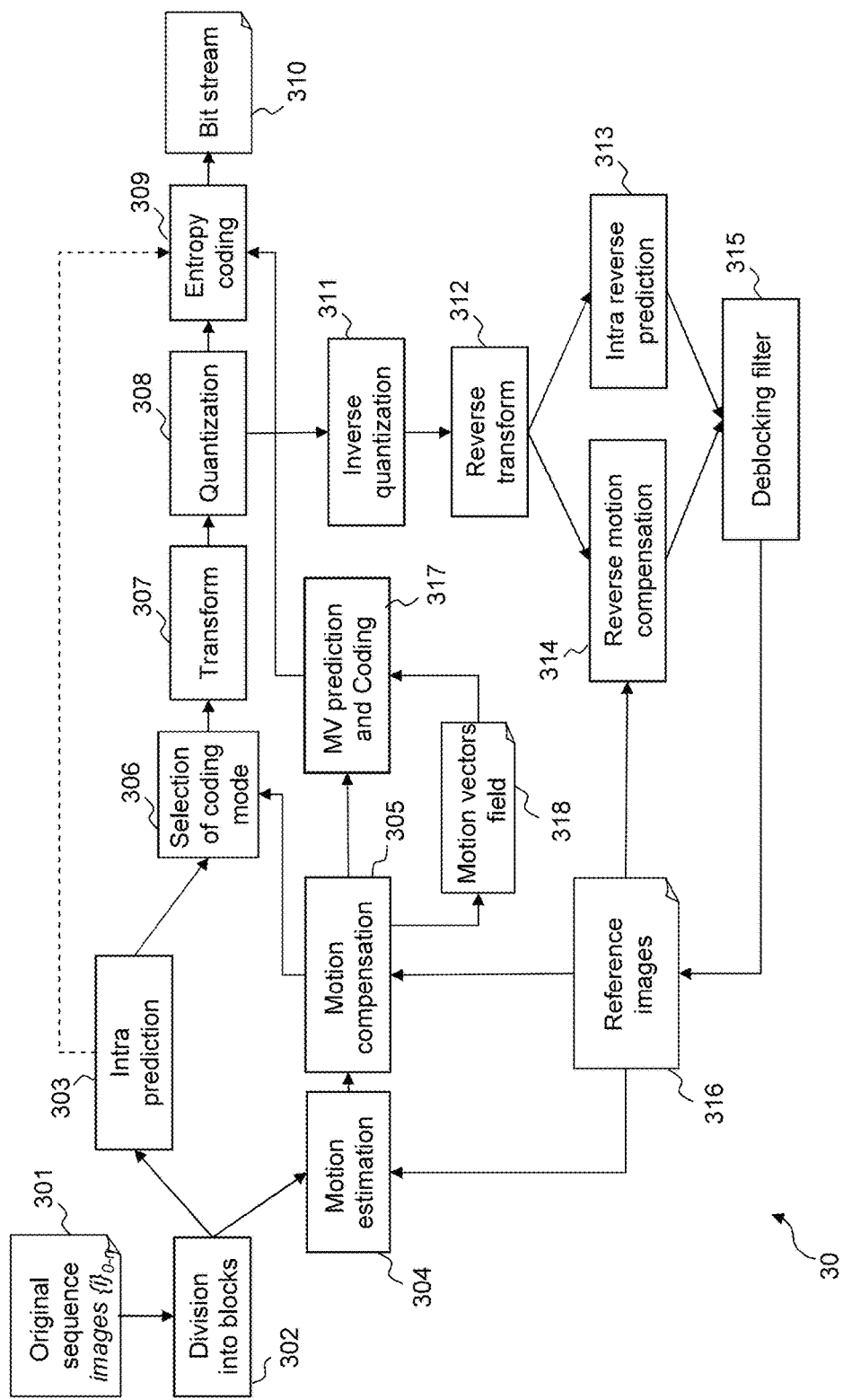
FIG. 3 is a block diagram of an encoder according to an embodiment of the invention.

FIG. 3 illustrates a block diagram of an encoder according to an embodiment of the invention. The encoder is represented by connected modules, each module being adapted to implement, for example in the form of programming instructions to be executed by the CPU 1111 of device 1000, a corresponding step of a method implementing an embodiment of the invention.

An original sequence of digital images $i_0$ to $i_n$ 301 is received as an input by the encoder 30. Each digital image is represented by a set of samples, known as pixels.

A bitstream 310 is output by the encoder 30.

The bitstream 310 comprises a plurality of encoding units or slices, each slice comprising a slice header for encoding values of encoding parameters used to encode the slice and a slice body, comprising encoded video data.

The input digital images are divided into blocks (302), which blocks are image portions and may be of variable sizes (e.g. 4×4, 8×8, 16×16, 32×32). A coding mode is selected for each input block. There are two families of coding modes, spatial prediction coding or Intra coding, and temporal prediction coding or Inter coding. The possible coding modes are tested.

Module 303 implements Intra prediction, in which the given block to encode is predicted by a predictor computed from pixels of the neighbourhood of said block to encode. An indication of the Intra predictor selected and the difference between the given block and its predictor is encoded if the Intra coding is selected.

Temporal prediction is implemented by modules 304 and 305. Firstly a reference image among a set of reference images 316 is selected, and a portion of the reference image, also called reference area, which is the closest area to the given block to encode, is selected by the motion estimation module 304. The difference between the selected reference area and the given block, also called a residual block, is computed by the motion compensation module 305. The selected reference area is indicated by a motion vector.

An information relative to the motion vector and the residual block is encoded if the Inter prediction is selected. To further reduce the bitrate, the motion vector is encoded by difference with respect to a motion vector predictor. A set of motion vector predictors, also called motion information predictors, is obtained from the motion vectors field 318 by a motion vector prediction and coding module 317.

Figure 5:
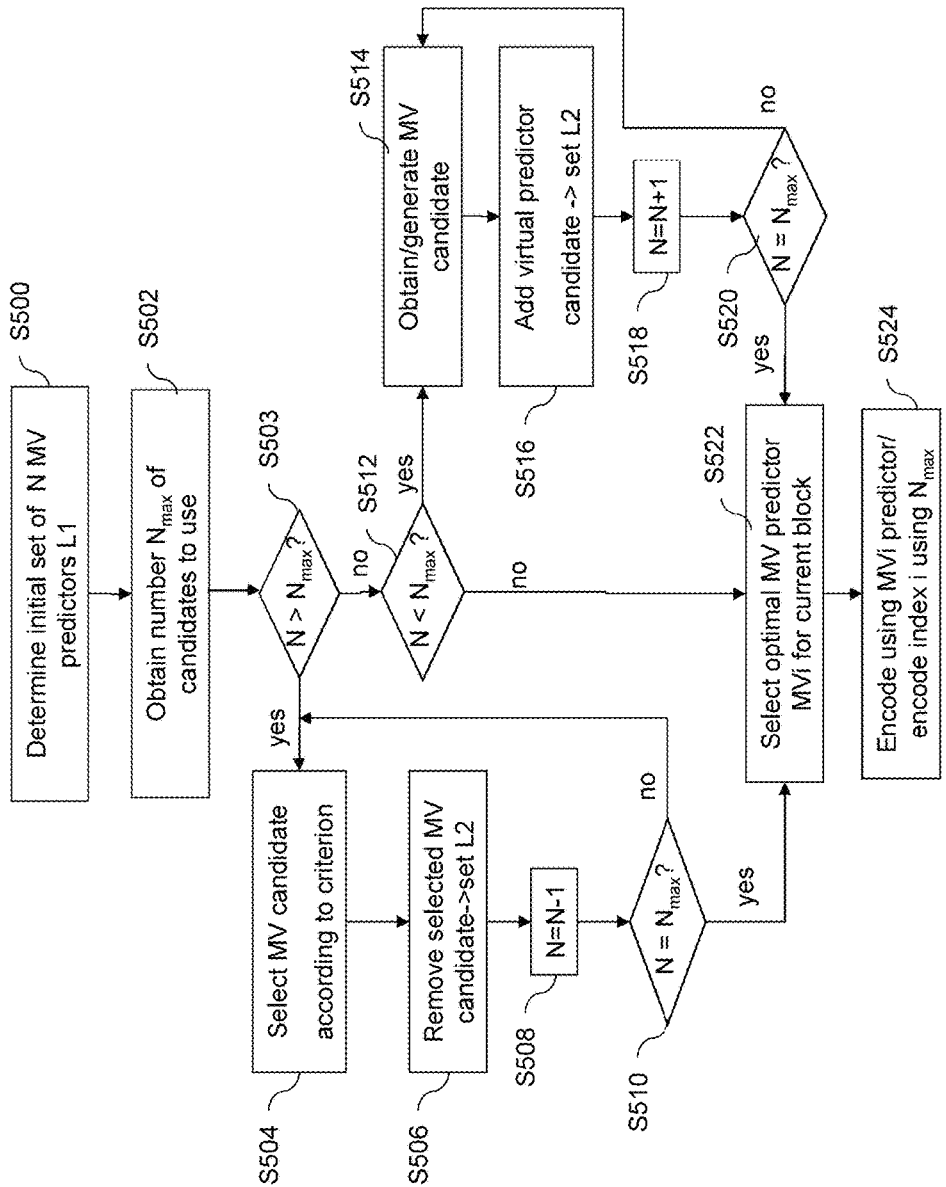
FIG. 5 details the determination of a set of motion vector predictors according to a first embodiment.
Figure 6:
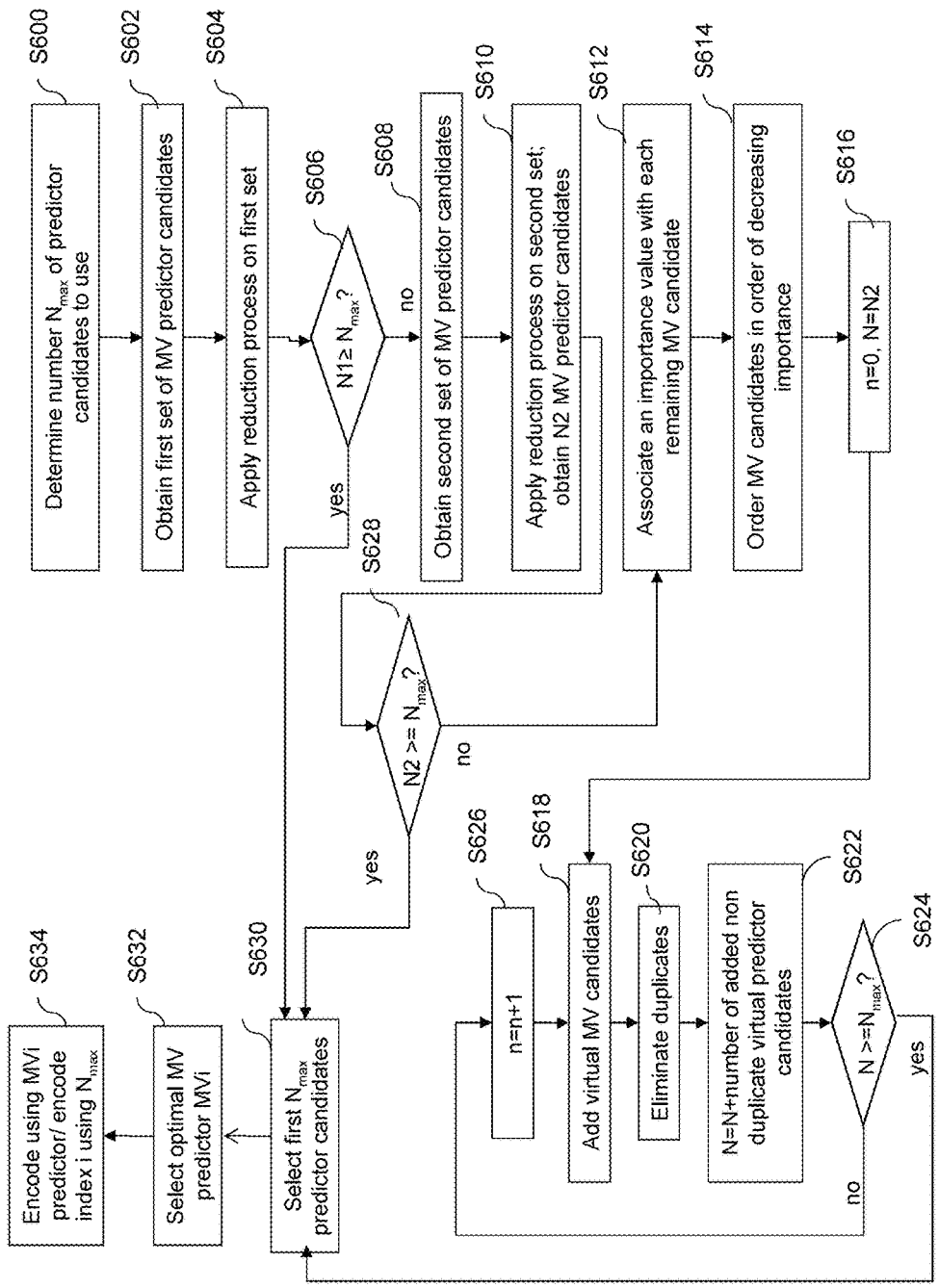
FIG. 6 details the determination of a set of motion vector predictors according to a second embodiment.

Advantageously, the set of motion vector predictors used to select a best motion vector predictor to encode a current motion vector is generated as explained in more detail hereafter with respect to FIGS. 5 and 6. For a given current block to encode, a predetermined number $N_{max}$ of motion vector predictors is set, and consequently the index of the selected motion vector predictor, which is an item of information representative of the selected motion vector predictor, can be encoded using a predetermined number of bits. This predetermined number of bits can be also retrieved by the decoder even in case of losses, therefore it is ensured that the decoder will be able to parse the bitstream even in case of errors or losses. The $N_{max}$ motion vector predictors are selected according to various embodiments to be all different from one another so as to enhance the compression efficiency.

The selection of the predetermined number $N_{max}$ of motion vector predictors and of the corresponding number of bits to encode the index of the motion vector predictor can be applied either for the entire sequence, or for a group of images of the sequence, or at the block level depending on an encoding parameters such as the block size or the encoding mode. For example, a first predetermined number of motion vector predictors $N_{max1}$ can be used for the blocks encoded using Inter prediction for which a residual block is encoded, and a second predetermined number motion vector predictors $N_{max2}$ can be used for the blocks encoded using the SKIP mode, for which only a motion vector is encoded, but no residual block. The respective numbers of motion vector predictors $N_{max1}$ and $N_{max2}$ can be for example signaled in the bitstream by inserting them in a header, such as the slice header, or in any appropriate metadata field.

The encoder 30 further comprises a module of selection of the coding mode 306, which uses an encoding cost criterion, such as a rate-distortion criterion, to determine which is the best mode among the spatial prediction mode and the temporal prediction mode. A transform 307 is applied to the residual block, the transformed data obtained is then quantized by module 308 and entropy encoded by module 309. Finally, the encoded residual block of the current block to encode is inserted in the bitstream 310, along with the information relative to the predictor used. For the blocks encoded in 'SKIP' mode, only a reference to the predictor is encoded in the bitstream, without any residual block.

The encoder 30 further performs the decoding of the encoded image in order to produce a reference image for the motion estimation of the subsequent images. The module 311 performs inverse quantization of the quantized data, followed by an inverse transform 312. The reverse motion prediction module 313 uses the prediction information to determine which predictor to use for a given block and the reverse motion compensation module 314 actually adds the residual obtained by module 312 to the reference area obtained from the set of reference images 316. Optionally, a deblocking filter 315 is applied to remove the blocking effects and enhance the visual quality of the decoded image. The same deblocking filter is applied at the decoder, so that, if there is no transmission loss, the encoder and the decoder apply the same processing.

Figure 4:
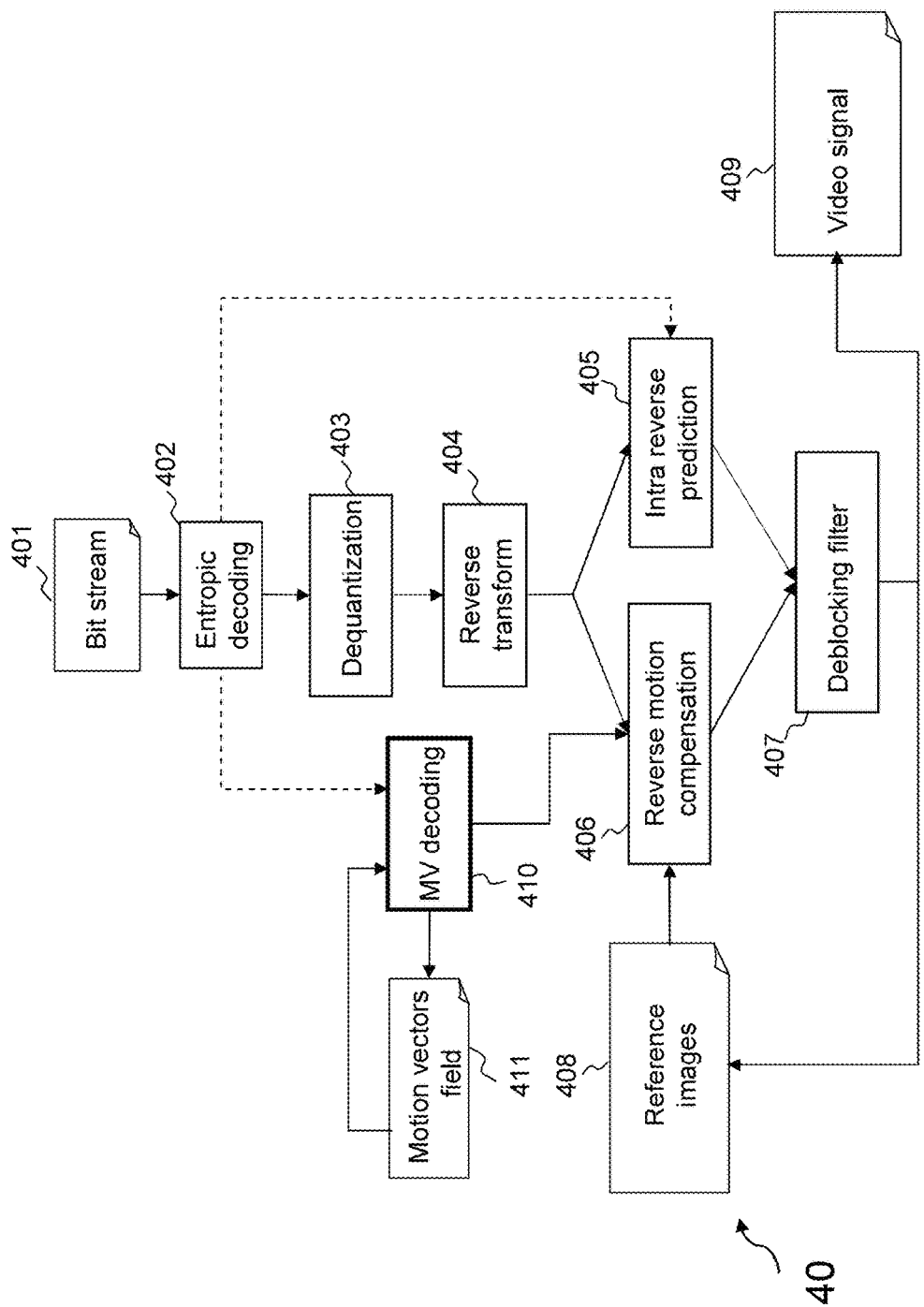
FIG. 4 illustrates a block diagram of a decoder according to an embodiment of the invention.

FIG. 4 illustrates a block diagram of a decoder according to an embodiment of the invention. The decoder is represented by connected modules, each module being adapted to implement, for example in the form of programming instructions to be executed by the CPU 1111 of device 1000, a corresponding step of a method implementing an embodiment of the invention.

The decoder 40 receives a bitstream 401 comprising encoding units, each one being composed of a header containing information on encoding parameters and a body containing the encoded video data. As explained with respect to FIG. 3, the encoded video data is entropy encoded, and the motion vector predictors' indexes are encoded, for a given block, on a predetermined number of bits. The received encoded video data is entropy decoded (402), dequantized (403) and then a reverse transform (404) is applied.

In particular, when the received encoded video data corresponds to a residual block of a current block to decode, the decoder also decodes motion prediction information from the bitstream, so as to find the reference area used by the encoder.

The module 410 applies the motion vector decoding for each current block encoded by motion prediction, comprising determining the number $N_{max}$ of motion vector predictors used and retrieving the motion vector predictor index encoded on a number of bits dependent on $N_{max}$. Similarly to module 317 of FIG. 3, motion vector decoding module 410 generates a set of $N_{max}$ motion vector predictors. The embodiments explained hereafter with respect to FIGS. 5 and 6 apply similarly. If the bitstream is received without losses, the decoder generates exactly the same set of motion vector predictors as the encoder. In case of losses, it may not be possible to generate the set of motion vector predictors and therefore to correctly decode the motion vector associated with the current block. However, the parsing of the bitstream is always possible, even in case of losses, since the number of bits used to encode the index of the motion vectors predictor can be systematically retrieved by the decoder.

Once the index of the motion vector predictor for the current block has been obtained, if no losses have occurred, the actual value of the motion vector associated with the current block can be decoded and used to apply reverse motion compensation (406). The reference area indicated by the decoded motion vector is extracted from a reference image (408) to finally apply the reverse motion compensation 406.

In case an Intra prediction has been applied, an inverse Intra prediction is applied by module 405.

Finally, a decoded block is obtained. A deblocking filter 407 is applied, similarly to the deblocking filter 315 applied at the encoder. A decoded video signal 409 is finally provided by the decoder 40.

FIG. 5 details the generation of the set of motion vector predictors or motion vector candidates in a first embodiment of the present invention. All the steps of the algorithm represented in FIG. 5 can be implemented in software and executed by the central processing unit 1111 of the device 1000.

FIG. 5 represents a flowchart applied for a given current block to encode, which has an associated motion vector designating a reference area in a reference image.

Figure 1:
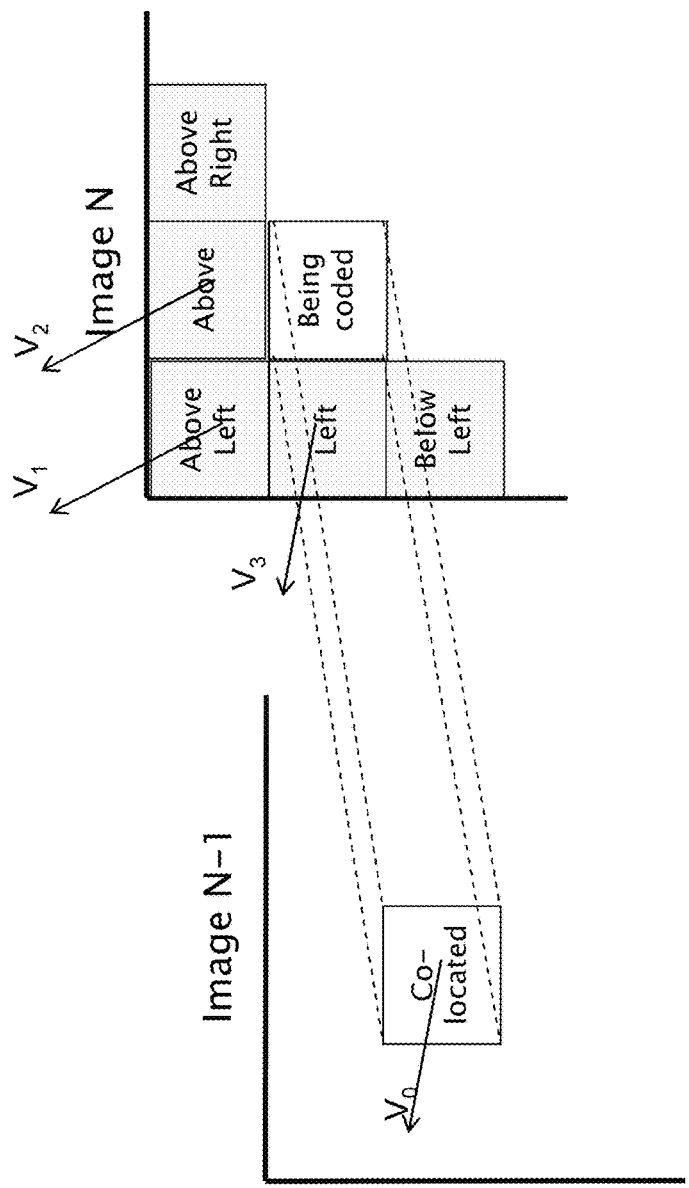
FIG. 1, already described, illustrates schematically a set of motion vector predictors used in a motion vector prediction scheme.

An initial set of motion vector predictors L1 is firstly obtained in step S500. The set L1 is composed of N candidates. In an embodiment, the initial set of motion vector predictors comprises the motion vector candidates selected according to the motion vector prediction scheme AMVP already described with reference to FIG. 1, for example vectors $V_0$ to $V_3$ of FIG. 1 and the median vector computed from $V_1$, $V_2$ and $V_3$. Accordingly, N is a maximum of 5.

Preferably, the initial set of motion vector predictors L1 contains only motion vectors different from one another. Taking the example of FIG. 1, only motion vectors $V_0$, $V_1$ and the median vector should be kept in L1, and the number of motion vector predictors is N=3.

In an alternative embodiment, any other scheme for selecting motion vectors already computed and computing other motion vectors from available ones (i.e. average, median etc) to form the initial set of motion vector predictors L1 can be applied.

In a yet another alternative embodiment, the initial set of motion vector predictors L1 is empty and N=0.

In the following step S502, the target number $N_{max}$ of candidate motion vector predictors to use is obtained. $N_{max}$ may either be predetermined for the entire sequence of digital images to encode, for example $N_{max}$=4, or may be selected according to encoding parameters of the current block to encode or of the encoding unit (for example the slice) to which the current block to encode belongs.

For example, the number $N_{max}$ may be dependent on the size of the transform applied to the macroblock to which the current block being processed belongs: e.g. $N_{max}$=p for a transform applied on a block of $2^{p+1} \times 2^{p+1}$.

In an embodiment, the number of bits k to use for encoding the index of the motion vector predictor is directly related to $N_{max}$: k=$INT_{sup}(\log_2(N_{max}))$, where $INT_{sup}(x)$ is the integer number immediately following the value x. Preferably, $N_{max}$ should be a power of 2, $N_{max}=2^k$, so as to use all the indexes that can be encoded on k bits. Advantageously, all the bits used for signaling are used so as to be able to designate a variety of motion vector predictors and to improve the compression.

Alternatively, any type of encoding of the indexes representative of the motion vector predictors can be used, after the number of different motion vector predictors $N_{max}$ has been determined. In particular, any type of entropy encoding, such as Huffman encoding or arithmetic encoding can be used. Also, the indexes may be also encoded using a prefix type code, such as a Rice-Golomb or a unary code.

Next, it is tested in step S503 whether the number N of motion vector predictors of set L1 is higher than $N_{max}$.

In case of positive answer, test S503 is followed by step S504 of selection of a motion vector predictor candidate from L1, followed by the removal of the selected motion vector predictor candidate from L1 in step S506 to form a modified set of motion vector predictors L2.

Figure 8:
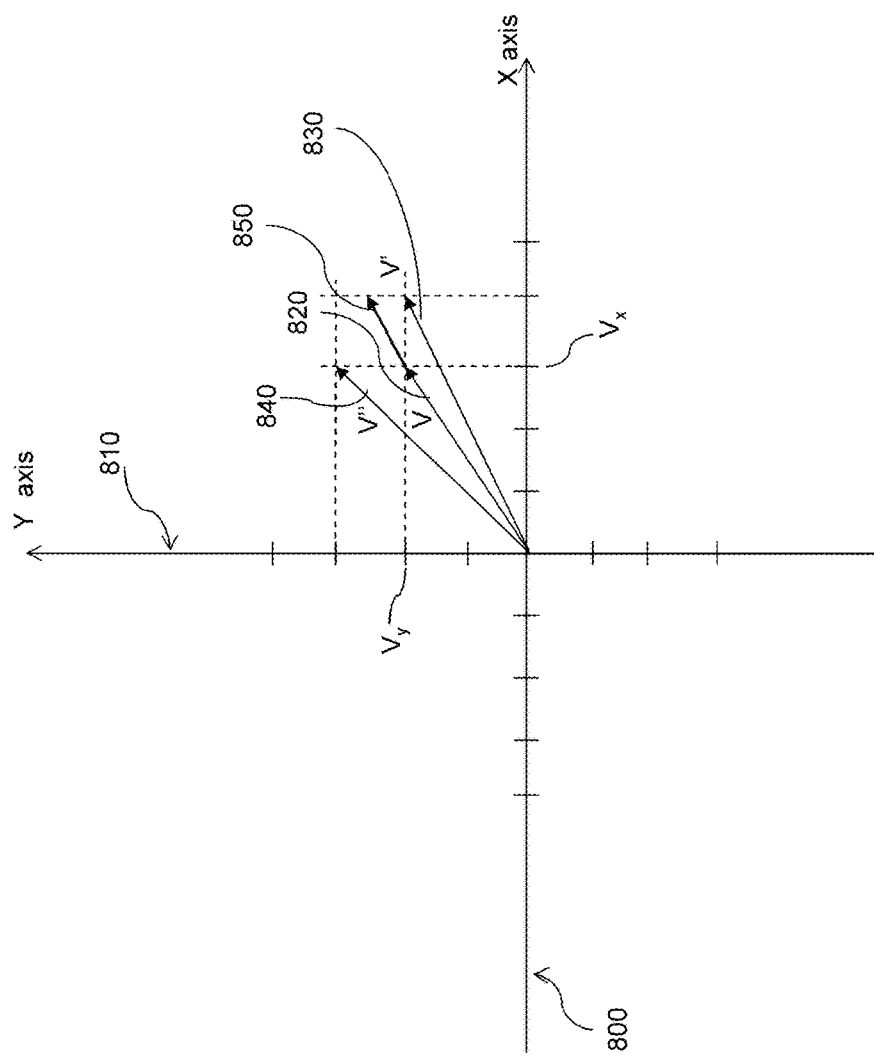
FIG. 8 illustrates schematically motion vectors in a coordinates system.

The selection of step S504 is applied according to a removal criterion, for example a distance criterion. For example, the set L1 comprises motion vectors predictors $\{V_1, \ldots V_N\}$, wherein each motion vector predictor is a vector represented by its components or coordinates on the X-axis and the Y-axis in a coordinate system, as represented in FIG. 8.

In an embodiment, step S504 determines the distance between each vector $V_k$ and each other vector $V_n$ of L1 other than $V_k$ itself, by computing the distance as: $d(V_k, V_n) = |V_{kx} - V_{nx}| + |V_{ky} - V_{ny}|$, where |a| represents the absolute value of a. Taking the example of FIG. 8, vector V has the coordinates (3,2), vector V' has the coordinates (4,2) and V'' has the coordinates (3,3). In this example, $d(V,V')$= $d(V,V'')$=1, so V' and V'' are at the same distance from vector V, whereas $d(V',V'')$=2.

Any other type of metric for the calculation of the distances can be alternatively applied.

The minimal distance found $d(V_p,V_q)$ indicates the two closest vectors $V_p$, $V_q$, among the set L1, and therefore one of these two vectors is selected for removal. The selection of one of these two vector can be based on the distance of each one of them to the remaining motion prediction vectors in the modified set L1: the vector between $V_p$ and $V_q$ which has the smallest distance to another vector of the set L1 is selected for removal.

The effect is to ensure that the distance between the remaining vectors in the modified set L2 is maximal, so as to allow the use of motion vector predictors as varied or diverse as possible.

After the removal of the selected vector, the value of N is decreased (S508), and then N is compared to $N_{max}$ (S510). If the value of N has not reached yet $N_{max}$ (answer 'no' to test S510) steps S504 to S510 are repeated. Otherwise, if N has reached $N_{max}$, step S510 is followed by step S522 described hereafter.

If the answer to test S503 is 'no', then test S512 checks whether N is lower than $N_{max}$. In case of negative answer, i.e. if N=$N_{max}$, test S512 is followed by step S522 described hereafter.

If the answer to test S512 is 'yes', i.e. if N is strictly lower than $N_{max}$, then test S512 is followed by step S514 of obtaining or generating an additional motion vector predictor candidate. Indeed, starting from the initial set of motion vector predictors L1, it is possible to add other candidates as motion vector predictors, in a predetermined order, to form a modified set of motion vector predictors L2. Taking the example of FIG. 7, the motion vectors of blocks 710, 720, 730 and 740 can be added as possible motion vector predictors. Further, the 2 predictors among 770, 760, 750 which were not selected in S500 can be added as possible motion vector predictors.

For each potential motion vector predictor candidate MV, it is checked whether the motion vector predictor MV is different from all the motion vector predictor candidates already stored in the set L2.

Figure 7:
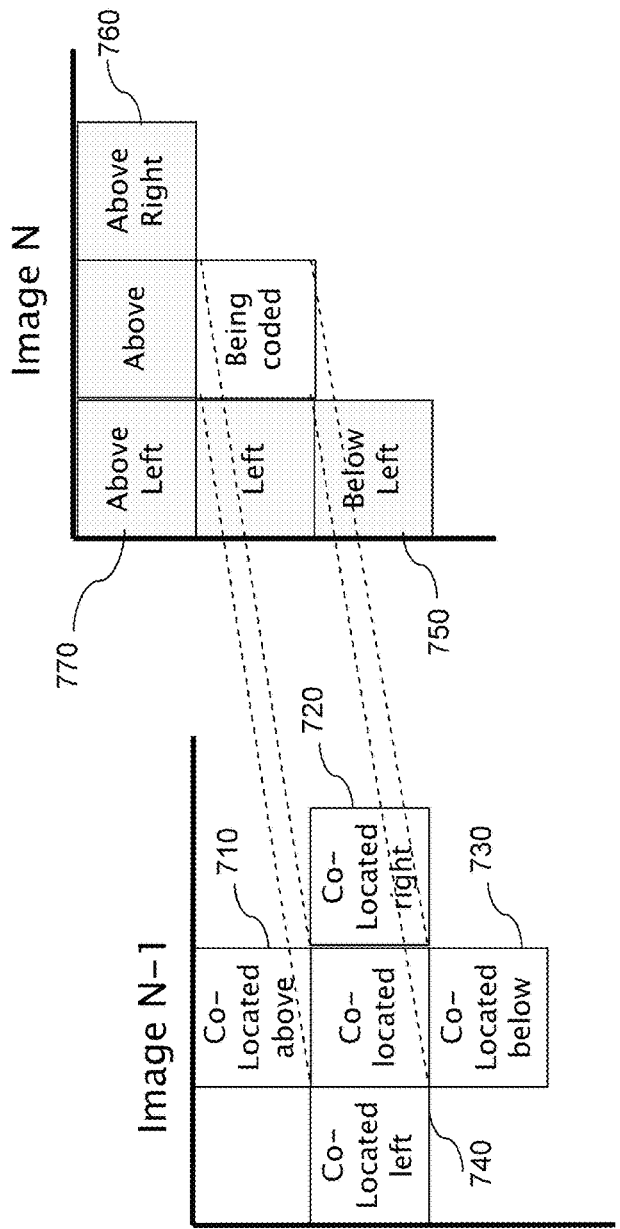
FIG. 7 illustrates schematically a second set of motion vector predictors.

If each potential motion vector candidate considered, as for example the motion vectors of blocks 710, 720, 730, 740, 750, 760 and 770 of FIG. 7, is equal to a motion vector predictor of set L2, new 'virtual' motion vector predictor candidates are computed in step S514.

Such motion vector predictor candidates are called virtual because they are not motion vectors of other blocks of the current image or of the reference image. The virtual motion vector predictors are computed from existing motion vector predictors, for example by adding offsets. For example, from a motion vector MV of set L2 of coordinates ($MV_x$, $MV_y$), it is possible to compute four virtual motion vector predictors by adding/subtracting an offset off to its coordinates: MV'($MV_x \pm$off, $MV_y \pm$off). Typically, off may be set equal to 1 or 2.

Alternatively, other modifications of the components of the motion vector predictor MV to obtain virtual motion vector predictors can be applied, so as to obtain diverse motion vector predictors starting from the existing motion vector predictors in order to increase the compression efficiency.

For example, the components of the motion vector MV may be modified independently, using respectively two values offx and offy, and either offx or offy may be set to 0.

In an embodiment, both offx and offy are proportional to the corresponding component: offx=$aMV_x$ and offy=$bMV_y$ with a and b typically smaller than 0.5. If necessary, the modified coordinates $MV_x$ and $MV_y$ are rounded to the closest integer value, so as to represent a displacement on the grid of pixels.

In an embodiment, a supplementary motion vector, of predetermined norm, is added to the vector MV, the supplementary vector having the same direction as motion vector MV, as represented in FIG. 8: supplemental vector 850 is added to vector 820.

In yet another alternative embodiment, a variance of the motion vectors of the set L2 is computed:

$$\text{var} = \sum_{MV \in L2} (MV_x - \overline{MV_x})^2 + (MV_y - \overline{MV_y})^2$$

where $\overline{MV_x}$ represents the mean value of the $MV_x$ coordinates of the vectors of L2 and $\overline{MV_y}$ represents the mean value of the $MV_y$ coordinates of the vectors of L2. Then, the offset off is selected by comparing the calculated value var to a predetermined threshold T. T can be equal to 50/L2. If var is lower than T, the value off is small, for example off=1; if var is higher than T, off is set to a larger value, for example off=3. Further, in this embodiment also, a differentiated value offx or offy can be computed for each component.

One motion vector predictor obtained in step S514 is added to the set of motion vector predictors L2 in step S516, and the number N is increased by 1 (step S518).

Next, it is checked in step S520 is N is equal to $N_{max}$. In case of negative answer, steps S514 to S520 are repeated.

In case of positive answer, the determined target number of motion vector predictor candidates $N_{max}$ has been reached, and step S520 is followed, at the encoder, by the step S522 of selection of an optimal motion vector predictor for the current block from set L2. For example, a rate-distortion optimization criterion is applied to select the optimal motion vector predictor $MV_i$ to encode the motion vector of the current block.

At the encoder, the motion residual, i.e. the difference between the motion vector of the current block and the selected motion vector predictor is encoded, as well as an indication of the motion vector predictor selected in step S524. For example, the index i of the selected motion vector predictor $MV_i$ of L2 is encoded, using $k=INT_{sup}(\log_2(N_{max}))$ bits.

Alternatively, an entropy encoding of the index i may be applied.

In yet another alternative, the index i can be encoded using a prefix type code, such as the Rice-Golomb code, in which each value i is encoded using i '1's followed by a '0'.

The algorithm of FIG. 5 can also be implemented by a decoder to generate the set of motion vector predictor or motion vector candidates for a given block, without steps S522 and S524.

At the decoder, the index i of the selected motion vector predictor MVi for the given block to decode is obtained from the bitstream, knowing $N_{max}$ and therefore the number of bits k on which the index i has been encoded. The steps S500 to S518 are similarly implemented to obtain the set of motion vector predictors L2, so that the index i decoded from the bitstream designates the motion vector predictor actually used by the encoder.

In case of losses during transmission, since the number $N_{max}$ can be systematically retrieved by the decoder, the received bitstream can be systematically parsed to extract the index i designating the selected motion vector predictor, even if, depending on the packets lost, the complete set of motion vector predictors L2 may not be obtained at the decoder.

FIG. 6 details the generation of the set of motion vector predictors or motion vector candidates in a second embodiment of the present invention. All the steps of the algorithm represented in FIG. 6 can be implemented in software and executed by the central processing unit 1111 of the device 1000.

FIG. 6 represents a flowchart applied for a given current block to encode, which has an associated motion vector designating a reference area in a reference image.

Firstly, similarly to step S502 of FIG. 5, the target number $N_{max}$ of motion vector predictor candidates to use is determined in step S600.

In an embodiment, $N_{max}$ is of the form $2^k$, so that each index value that can be coded on k bits corresponds to a possible motion vector predictor.

For example, in order to use all motion vector predictors of the AMVP scheme which proposes 5 motion vector predictors, 3 bits are necessary to encode the index of a motion vector predictor. In this case, preferably $N_{max}=2^3=8$.

An initial set of motion vector predictor candidates L1 is obtained in step S602. For example, the initial set of N=5 motion vector predictors of AMVP is selected.

A reduction process is applied on the initial set of motion vector predictors to eliminate duplicates, so as to obtain a reduced set of motion vector predictors containing N1 elements. Preferably, the number of duplicates of each remaining vector after the reduction process is recorded and stored in a memory for a subsequent use in step S612 described hereafter.

It is next checked (test S606) whether N1 is higher than or equal to $N_{max}$, the target number of motion vector predictors. It may be pointed out that a positive outcome to this test only occurs if the algorithm starts with a first set of motion vector predictors a greater number of motion vectors than $N_{max}$. In case of positive answer, step S606 is followed by step S630 of selection of the first $N_{max}$ motion vector predictor candidates of the set L1 to form the set of motion vector predictors L2.

In case of negative answer, i.e. if N1 is lower than $N_{max}$, the set of motion vector predictors has to be complemented with additional motion vector predictors.

A second set of motion vector predictor candidates L1' is obtained in step S608.

The second set of motion vector predictors L1' is composed of the remaining motion vector predictors of the first set L1 and of additional motion vectors, for example corresponding to the motion vectors of the block 710, 720, 730 and 740 of the reference image as represented on FIG. 7. Further, the 2 predictors among 770, 760, and 750 which were not selected in S600 can be added as possible motion vector predictors. Each motion vector predictor of the set L1' has a corresponding index.

Next, a reduction process is applied to the second set of motion vector predictors in step S610 to obtain a reduced second set of motion vector predictors L1" of N2 vectors. The reduction process eliminates the duplicates, so that all motion vector predictors of L1" are different from one another. The number of duplicates of each vector kept in L1" is recorded and stored in a memory for a subsequent use in step S612 described hereafter.

It is then checked in step S628 whether the number of motion vector predictors N2 is higher than or equal to $N_{max}$. In case of positive answer, step S628 is followed by step S630 already described.

In case of negative answer, it is necessary to add more motion vector predictors to the reduced second set of motion vector predictors L1" to obtain the final set of $N_{max}$ motion vector predictors.

Following the test S628, in case of negative answer, an importance value is assigned to each remaining motion vector predictor candidate of the reduced second set of motion vector predictors L1" in step S612.

In an alternative embodiment, step S612 follows directly test S606, in case of negative answer to test S606.

The importance value is computed in this embodiment as the number of duplicates of a given motion vector predictor, using the number of duplicates of a given motion vector predictor computed and stored during steps S604 and S610. Taking the example of FIG. 1, two vectors, $V_0$ and $V_3$, are equal, so vector $V_0$ has an importance value equal to 2.

In an alternative embodiment, the importance value can be computed as a function of the distance to a representative vector of the set of vectors considered, such as the average value of the vectors of the set or the median of the vectors of the set. Then, the importance may be computed as the inverse of the distance of a given vector of the set Vn to the representative vector: the closer a vector Vn is to the representative vector of the set, the higher the importance of Vn.

Then, the N2 remaining motion vector predictor candidates are ordered in step S614 according to an order of decreasing importance value. If several motion vector predictors have the same importance value, they can be ordered according to the increasing order of their indexes.

The re-ordered motion vector predictors are re-assigned increasing indexes $\{V_0, V_1, \ldots, V_{N2-1}\}$.

In the following step S616, a variable n is initialized to 0 and a variable N is initialized to N2, which is the current number of motion vector predictors in the re-ordered set.

Next, in step S618 following step S616, virtual motion vector predictor candidates are added to the re-ordered set. In this embodiment, the virtual motion vector predictors are computed from the remaining motion vector predictors, ordered according to their importance. The motion vector predictor of index n of the re-ordered set, Vn of coordinates $(Vn_x, Vn_y)$, is considered. The following list of 8 virtual motion vector predictors, defined by their coordinates, can be computed from Vn, by adding successively +off and −off to one or the two coordinates of Vn: $\{(Vn_x+\text{off}, Vn_y)$, $(Vn_x-\text{off}, Vn_y)$, $(Vn_x+\text{off}, Vn_y+\text{off})$, $(Vn_x+\text{off}, Vn_y-\text{off})$, $(Vn_x-\text{off}, Vn_y+\text{off})$, $(Vn_x-\text{off}, Vn_y-\text{off})$, $(Vn_x, Vn_y+\text{off})$, $(Vn_x, Vn_y-\text{off})\}$.

Any alternative computation of the virtual motion vector predictors starting from the motion vector predictor Vn, in particular the alternatives described above with respect to step S514 of FIG. 5, may be used.

This list of virtual motion vector predictors is added to the current set of motion vector predictors.

The duplicates are eliminated in step S620.

The value N is updated in step S622 to the remaining number of motion vector predictors after the removal of potential duplicates.

Next, it is checked whether N is higher than or equal to $N_{max}$ in step S624. In case of negative answer, step S624 is followed by step S634 of increasing of the value n by 1, and steps S618 to S624 are repeated.

In case of positive answer to step S624, sufficient motion vector predictors have been obtained. Step S624 is followed by step S630 of selection of the first $N_{max}$ motion vector candidates to constitute the final set of motion vector predictors L2 of $N_{max}$ vectors.

At the encoder, step S630 is followed by step S632, analogous to step S522 of FIG. 5, of selection of an optimal motion vector predictor MVi among the set of motion vector predictors for the current block, according to a predetermined criterion such as a rate-distortion criterion.

Step S632 is followed by a step S634 of encoding the motion vector of the current block using the motion vector predictor MVi, similar to step S524 of FIG. 5. For example, the index i of the motion vector predictors MVi is encoded using k bits, k being computed from $N_{max}$, $k=\text{INT}_{sup}(\log_2(N_{max}))$.

Alternatively, an entropy encoding of the index i may be applied.

In yet another alternative, the index i can be encoded using a prefix type code, such as the Rice-Golomb code, in which each value i is encoded using i '1's followed by a '0'.

The algorithm of FIG. 6 can also be implemented by a decoder to generate the set of motion vector predictors or motion vector candidates for a given block, except steps S632 and S634 are omitted on the decoder side.

At the decoder, the index i of the selected motion vector predictor MVi for the given block to decode is obtained from the bitstream, knowing $N_{max}$ and therefore the number of bits k on which the index i has been encoded. The steps S600 to S630 are similarly implemented to obtain the set of motion vector predictors L2, so that the index i decoded from the bitstream designates the motion vector predictor actually used by the encoder.

In case of losses during transmission, since the number $N_{max}$ can be systematically retrieved by the decoder, the received bitstream can be systematically parsed to extract the index i designating the selected motion vector predictor, even if, depending on the packets lost, the complete set of motion vector predictors L2 may not be obtained at the decoder.

The embodiments described above are based on block partitions of input images, but more generally, any type of image portions to encode or decode can be considered, in particular rectangular portions or more generally geometrical portions.

Other alternative embodiments may be envisaged, such as for example starting with a large set of motion vector predictor candidates, comprising a number of vectors N larger than the target number of motion vector predictors determined $N_{max}$, and applying a clustering type algorithm to reduce the set of vectors. For example, a Voronï partition can be applied to reduce the set to the $N_{max}$ most representative vectors of the set according to a predefined distance between the vectors of the set.

More generally, any modification or improvement of the above-described embodiments, that a person skilled in the art may easily conceive should be considered as falling within the scope of the invention.

The invention claimed is:

1. A method of decoding a bitstream comprising a sequence of digital images encoded using inter prediction, the method comprising the steps of:
   obtaining one or more potential motion information predictors including a motion information predictor from an image block situated left of an image block being decoded when the motion information predictor from the image block situated left is available; and
   generating a set of motion information predictors including at least one motion information predictor from among the obtained one or more potential motion information predictors, each potential motion information predictor being associated with an image block having a predetermined spatial relationship with the image block being decoded, determining whether the obtained one or more potential motion information predictors include one or more duplicates, and in the event of said determining, the set of motion information predictors is generated without at least one of the duplicates and one or more additional motion information predictors are added until a number of motion information predictors in the set to be generated is a target number.

2. A device for decoding a bitstream comprising a sequence of digital images, encoded using inter prediction, the device comprising:

an obtainer configured to obtain one or more potential motion information predictors including a motion information predictor from an image block situated left of an image block being decoded when the motion information predictor from the image block situated left is available; and a generator configured to generate a set of motion information predictors including at least one motion information predictor from among the obtained one or more potential motion information predictors, each potential motion information predictor being associated with an image block having a predetermined spatial relationship with an image block being decoded, the generator being further configured so that in the case that the obtained one or more potential motion information predictors include one or more duplicates, the set of motion information predictors is generated without at least one of the duplicates and one or more additional motion information predictor are added until a number of motion information predictors in the set to be generated is a target number.

3. A non-transitory computer readable carrier medium comprising processor executable code for performing a method of decoding a bitstream comprising a sequence of digital images encoded using inter prediction, wherein execution of the processor executable code by one or more processors causes the one or more processors to obtaining one or more potential motion information predictors including a motion information predictor from an image block situated left of an image block being decoded when the motion information predictor from the image block situated left is available and to generate a set of motion information predictors including at least one motion information predictor from among the obtained one or more potential motion information predictors, each potential motion information predictor being associated with an image block having a predetermined spatial relationship with an image block being decoded, determining whether the one or more obtained potential motion information predictors include one or more duplicates, and in the event of said determining, the set of motion information predictors is generated without at least one of the duplicates and one or more additional motion information predictors are added until a number of motion information predictors in the set to be generated is a target number.

* * * * *